ns Patent [19]

United States Patent [19]

Gurcan

[11] Patent Number: 4,985,902
[45] Date of Patent: Jan. 15, 1991

[54] DECISION FEEDBACK EQUALIZER AND A METHOD OF OPERATING A DECISION FEEDBACK EQUALIZER

[75] Inventor: Mustafa K. Gurcan, Crawley, England

[73] Assignee: U.S. Philips Corporation, New York, N.Y.

[21] Appl. No.: 293,167

[22] Filed: Jan. 4, 1989

[30] Foreign Application Priority Data

Jun. 2, 1988 [GB] United Kingdom ............... 8813038

[51] Int. Cl.$^5$ ............................................. H03H 21/00
[52] U.S. Cl. .......................................... 375/14; 333/18
[58] Field of Search ..................................... 375/12–14, 375/102; 333/18

[56] References Cited

U.S. PATENT DOCUMENTS

| 3,879,664 | 4/1975 | Monsen | 375/14 |
| 3,974,449 | 8/1976 | Falconer | 375/14 |
| 4,271,525 | 6/1981 | Watanabe | 375/14 |
| 4,847,869 | 7/1989 | Labedz et al. | 375/102 |

OTHER PUBLICATIONS

S. U. H. Qureshi, "Adjustment of the Position of the Reference Tap of an Adaptive Equalizer", IEEE Transactions on Communications, Sep. 1973, pp. 1046–1052.
D. D. Falconer et al. "Comparison of DFE and MLSE Performance of HF Channels", IEEE Global Communications Conference, Nov. 28–Dec. 1, 1983, Conf. Rec. vol. 1, pp. 1.3.1–1.3.6.
K. H. Mueller et al., "Timing Recovery in Digital Synchronous Data Receivers", IEEE Transactions on Communications, vol. COM-24, No. 5, May 1976, pp. 516–531.
H. Sari, "Baseband Equalizer Performance in the Presence of Selective Fading", IEEE Global Communications Conference, Nov. 28–Dec. 1, 1983, Conf. Rec. vol. 1, pp. 1.1.1–1.1.7.

Primary Examiner—Douglas W. Olms
Assistant Examiner—Marianne Huseman
Attorney, Agent, or Firm—Jack D. Slobod

[57] ABSTRACT

A decision feedback equalizer includes a transversal feedforward digital filter section (16) and a recursive feedback digital filter section (18) including a decision stage (20). In order to optimize the performance of the equalizer, the reference tap position is preferably aligned with a storage location of the feedforward filter section (16) containing the first sample of a current symbol and any contemporaneous samples of preceding symbols, the second and subsequent samples of the current symbol being contained in other storage locations of the feedforward filter section (16). In the case of data being in bursts a better performance may be obtained by time reversing the data applied to the feedforward filter section (16).

13 Claims, 5 Drawing Sheets

DECISION FEEDBACK EQUALIZER AND A METHOD OF OPERATING A DECISION FEEDBACK EQUALIZER

BACKGROUND OF THE INVENTION

1. Field of the Invention

The present invention relates to a decision feedback equaliser (DFEs) which comprises a feedforward part whose output is connected to an input of a decision stage and a feedback part connected between the output and input of the decision stage so that the inputs to the feedback part comprise previously detected symbols. The present invention also relates to a method of operating the DFE and to a receiver including the DFE.

2. Description of the Related Art

Equalisers are known per se and are used in communications receivers for enabling decisions to be made as to the nature of the data symbol which has been distorted by transmission through a dispersive channel which may comprise a cable or a radio link. Types of equalizers other than a DFE are linear equalizers (LEs) which comprise a feedforward filter whose output is connected to a threshold detector (or decision stage) and Viterbi (or Maximum Likelihood Sequence Estimation (MLSE)) equalizers in which a received signal is compared with signatures stored in a memory bank and the best match is obtained.

Viterbi equalizers are regarded as having a better performance to DFEs but this is at the expense of the Viterbi equalizer being of more complex construction and consuming a relatively large current compared to a DFE.

D. D. Falconer, A. Sheik, E. Eleftheriou and M. Tobis in an article "Comparison of DFE and MSLE Receiver Performance on H. F. Channels" Globecom 1983, Conf. Rec. Nov. 1983 pp 1.3.1. reported obtaining some real channel measurements and calculated the theoretical bit error rates for a DFE and a MSLE equaliser and obtained the conclusion that on average the theoretical optimums for both are equal to within 1 dB. However no implementation of a DFE which approaches the theoretical optimum is known to have been made for radio channels.

Various studies have been made of decision feedback equalisers which were originally devised for telephone channels and are used to remove unwanted sections of the channel filter impulse response in order to cancel or reduce the effects of intersymbol interference. K. H. Meuller and M. Muller in an article "Timing Recovery in Digital Synchronous Data Receivers" IEEE Transactions on Communications Vol. Com.-24, No. 5, May 1976 pages 516 to 531 reported that in their opinion the energy in received signal samples can be maximised with respect to noise by adjusting a receiver clock until the clocking point is aligned with the peak of the impulse response of the channel. Consequently it has been customary when operating DFE's on telephone channels to synchronise the reference tap of the DFE to the peak of the impulse response.

In the present specification the expressions reference tap and reference tap position are to be understood as meaning a synchronisation marker between the transmitter and the receiver. The reference tap position serves to compensate for the time delays occurring between the instant of transmission of a currently detected symbol and the instant a decision is made to estimate the symbols.

H. Sari in an article entitled "Baseband Equalizer Performance in the Presence of Selective Fading" published by the IEEE Global Telecommunications Conference Proceedings 1983 pages 111 to 117 discusses LEs and DFEs and mentions that tap-gain optimisation in baseband equalizers is usually carried out by fixing the position of the reference tap (RTP) and then minimising the output mean square error (MSE) for that fixed RTP. Sari shows that by making the position of the reference tap adaptive, a considerable performance improvement can be achieved in both equaliser structures and especially in DFEs. In order to achieve RTP adaption Sari proposes the use of a second (or slave) equaliser for estimating the optimum RTP and transferring it to the main equaliser. At the commencement of operation the main equaliser will start with the centre tap reference, because it is is considered to be the optimum position in the absence of fading. The slave equaliser will periodically try the N reference tap positions and for each RTP the estimated output MSE will be compared to that obtained with the main equalizer and every time a smaller MSE is obtained with the slave equaliser, the position of the reference tap of the latter as well as its tap-gain values will be transferred to the main equaliser.

Sari's proposal for using a slave equaliser for determining the best RTP to be used by the main DFE is to optimise the operation of the DFE with respect to different degrees of fading. However Sari does not consider the problem of choosing a RTP which will give an acceptable performance of the DFE for differnt channel impulse responses which will occur with mobile radio equipment. Also, particularly in the case of portable equipment, it is desirable to minimise the current consumption.

SUMMARY OF THE INVENTION

An object of the present invention is to improve the performance of DFEs.

According to a first aspect of the present invention there is provided a decision feedback equaliser for equalising data derived from a dispersive signalling channel, comprising a transversal feedforward filter section having an input for sequentially applied contemporaneous samples of symbols derived from the signalling channel and an output coupled to a decision stage which in use provides decisions to an input of a recursive feedback filter section, wherein the reference tap position of the equaliser is aligned with a storage location of the feedforward filter section which contains either the first sample of a current symbol whenever the first sample is the peak in the channel impulse response or a sample of a current symbol which precedes a peak in the channel impulse response for the current symbol.

In a preferred embodiment of the present invention the reference tap position is aligned with the storage location containing the first sample of the current symbol. If the first sample has a very low signal to noise ratio such that the first symbol sample is indistinguishable from noise then that sample is ignored and the storage location containing the second or subsequent sample which is above the noise floor is selected as the reference tap position. When implementing the present invention a threshold device is provided to define an acceptable noise floor. In so doing whenever the first sample is below the threshold, the DFE circuit may treat the channel impulse response as being shorter than normal in which case it will have fewer samples than normal. In this instance, the first sample will be the first sample above the threshold level.

In order to make clear what is meant by a first sample and samples of the current symbols which precede a peak, independent of sign, in a channel impulse response reference is made to FIGS. 1A to 1C of the accompanying drawings. FIG. 1A assumes that a transmitter transmits symbols in the order T1, T2, T3 and T4 at times $t_1$, $t_2$, $t_3$ and $t_4$ where $t_2$ follows $t_1$ in time and so on. Due to the dispersive nature of the communications channel, the transmitted energy of each symbol becomes smeared with respect to time in accordance with the channel impulse response of the communications channel. FIG. 1B shows the situation at the receiver with the smeared symbols $T_1'$, $T_2'$, $T_3'$ and $T_4'$, each symbol commencing at substantially the same instant as the original symbol was transmitted, that is, $t_1$, $t_2$, $t_3$ and $t_4$. The smeared signals are sampled at regular intervals, for example $x_1$, $x_2$, $x_3$, $x_4$, $x_5$ and $x_6$ as shown in FIG. 1C which shows the channel impulse response. Sample S3 is the peak sample and accordingly the first and second samples S1 and S2 precede it in time. In other words as viewed on an oscilloscope screen, the "first sample" S1 will appear at $x_1$ and as sampling of the same symbol takes place at $x_2$ to $x_6$ then the first sample $S_1$ will be displaced rightwards by the second sample S2, and so on. As successive symbols are transmitted in bursts it will mean that at any one instant at the receiver, for example $x_n$ in FIG. 1B, then the sample Sn will be composed of energy from symbols $T_1$, $T_2$, $T_3$ and $T_4$ and the DFE has to make a decision as to the value of the sample being transmitted.

Since the signal as received at the receiver is band limited, then the peak value of the channel impulse response will always be preceded by at least the first symbol sample. However it may arise in a radio communications system that at least the first symbol sample as received cannot be distinguished from the noise floor of the received signal in which case that sample has to be ignored and the next sample taken. In an exceptional case the second sample, or first acceptable sample, may be the peak in the channel impulse response.

The first aspect of the present invention also provides a decision feedback equalizer for equalizing data derived from a dispersive signalling channel, the equalizer comprising a feedforward filter section, a decision stage, a feedback filter section having an input connected to an output of the decision stage and a subtraction stage having a first input connected to an output of the feedforward filter section, a second input connected to an output of the feedback section and an output connected to an input of the decision stage, wherein the feedforward filter section includes storage means formed by a plurality of serially arranged storage locations, data being shifted stagewise in use from a first input storage location to a last output storage location, and wherein the reference tap position of the equalizer is aligned with that one of the storage locations which contains either the first sample of a current symbol whenever the first sample is the peak in the channel impulse response or a sample of a current symbol which precedes a peak in the channel impulse response for the current symbol.

The performance of the DFE can be improved further by the number of storage locations of the feedforward filter section between the first storage location and the reference tap position being at least equal to the anticipated number of samples in the impulse response of the channel.

According to a second aspect of the present invention there is provided a receiver including a DFE made in accordance with the present invention.

If desired the receiver may comprise means for training weighting coefficients of the feedforward and feedback filter sections.

According to a third aspect of the present invention there is provided a method of operating a decision feedback equalizer comprising a transversal feedforward filter section coupled to a decision stage included in a recursive feedback filter section, the method comprising sequentially applying contemporaneous samples of symbols derived from a dispersive communications channel to an input of the feedforward filter section, progressing the samples stagewise from a first storage location to a last storage location, and aligning the reference tap position of the equalizer with a storage location of the feedforward filter section which contains either the first sample of the current symbol whenever the first sample is the peak in the channel impulse response or a sample of a current symbol which precedes a peak in the channel impulse response for the current symbol.

The third aspect of the present invention also provides a method of operating a decision feedback equaliser comprising a feedforward filter section having a plurality of storage locations, a decision stage having an input and an output, a feedback filter section having an input connected to the output of the decision stage and an output connected to a first input of a subtraction stage, a second input of the subtraction stage being connected to an output of the feedforward filter section and an output of the subtraction stage being connected to the input of the decision stage, the method comprising sequentially applying contemporaneous samples of symbols to a first input storage location of the feedforward filter section, advancing the samples stagewise through the feedforward filter section to a last output storage location and aligning the reference tap position of the equalizer at a storage location of the feedforward filter section containing either the first sample of a current symbol whenever the first sample is the peak in the channel impulse response or a sample of a current symbol which precedes a peak in the channel impulse response for the current symbol.

The performance of the DFE can be improved further by the feedforward filter section containing the majority and preferably all of the samples of the current symbol constituting the impulse response of the channel.

The present invention is based on the realisation that taking the peak sample as a reference tap position of the equalizer will not always give the optimum performance. Experiments have shown that as a general rule the reference tap should be the position of a channel impulse response sample which is in the feedforward filter section and which precedes the peak value, independent of sign, of the channel impulse response, with the exception that the peak value is chosen if it is the first acceptable sample. Optimum bit error rate for a particular signal to noise ratio will be obtained by selecting the location of the first acceptable sample of the current symbol present in the feedforward filter section as the reference tap position. By using the location of the first sample as the reference tap position then all the samples of the current symbol can be used by the feedforward filter rather than only those following the peak in time. Additionally the feedback filter removes the effects of preceding decisions on the current decision. Compared to Sari, who assumes the peak in a channel impulse response as a starting point for determining the optimum reference tap position, the method in accordance with the present invention estimates the reference tap position from the channel impulse response duration measurement and in consequence time consuming dynamic searching is avoided. By adopting this approach the complexity of the construction of the DFE and the current consumption of such a DFE are minimised.

If the received data is in block form then for the purpose of training the equalizer the samples can be reversed in time by applying them to a last-in, first-out (LIFO) store so that the sample at the reference tap position is different from the non-reversed situation. Another LIFO is connected to the decision stage so that the output signals from the DFE are in the correct order. The bit error rate obtained using the reference tap position calculated in the time reversed situation may be closer to the theoretical optimum than the non-reversed situation in which case the block of data is processed in a time reversed mode.

BRIEF DESCRIPTION OF THE DRAWING

The present invention will now be described, by way of example, with reference to the accompanying drawings, wherein.

DETAILED DESCRIPTION OF THE PREFERRED EMBODIMENT

Figure 1A:
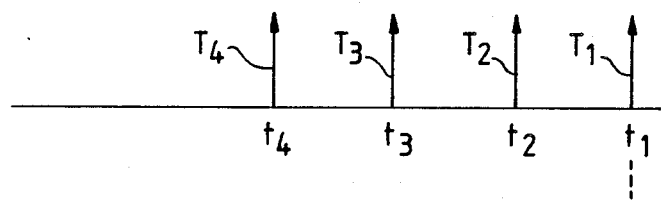
FIGS. 1A to 1C comprise diagrams for explaining what is meant by the "first sample" of a time dispersed symbol.
Figure 1B:
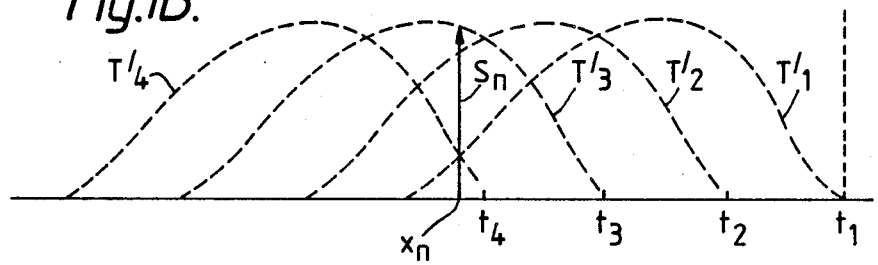
Figure 1C:
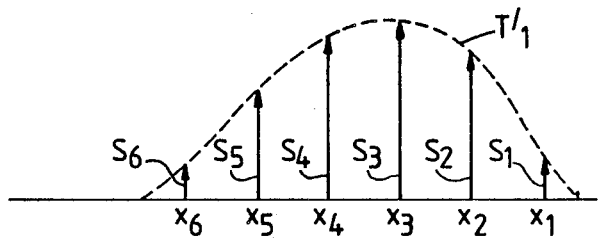

In the drawings the same reference numerals have been used to indicate corresponding features.

Figure 2:
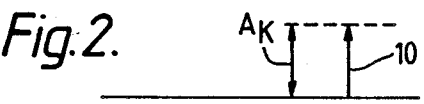
FIG. 2 illustrates a single pulse or symbol as transmitted.
Figure 3:
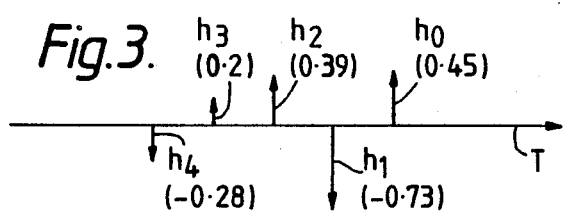
FIG. 3 illustrates an example of a channel impulse response.
Figure 4:
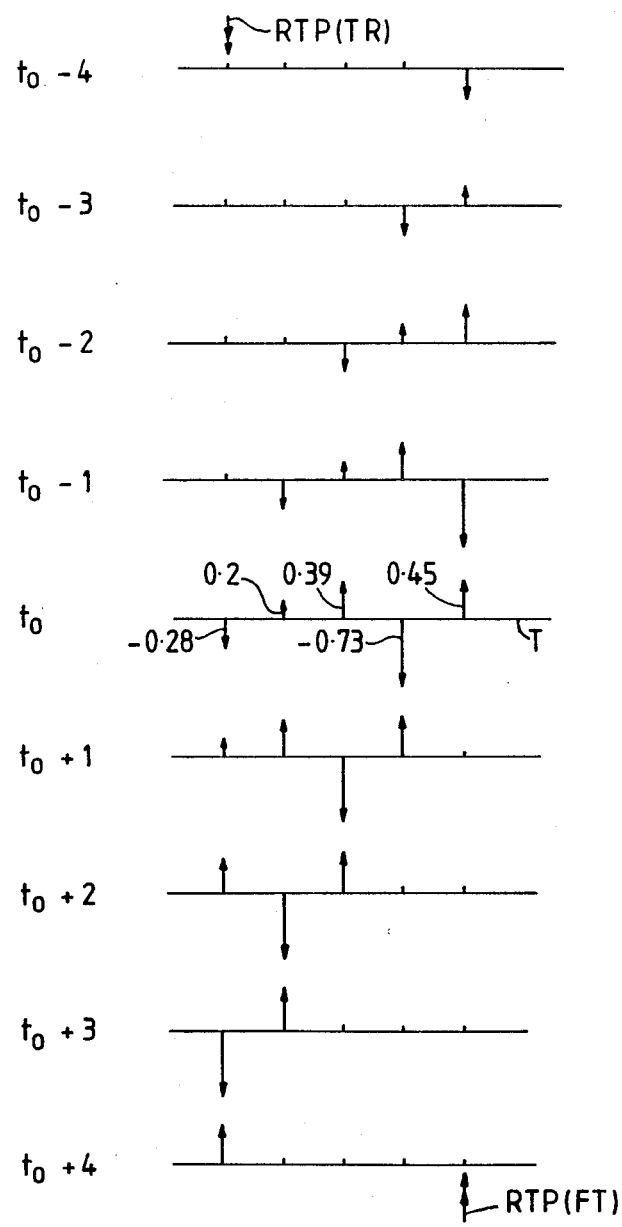
FIG. 4 illustrates the progression of samples of symbols through a tapped delay line having 5 taps.

FIG. 2 shows a single symbol or pulse 10 having an amplitude $A_K$. FIG. 3 illustrates an example of a channel impulse response of a dispersive channel. The effect of the dispersive channel is to spread the energy in the pulse 10 with respect to past time T, that is time as an observer would see on an oscilloscope screen, so that at a receiver the energy is received over a number of clock intervals 0 to 4, where 0 is the first and 4 is the last, having amplitudes $h_0 A_K$ to $h_4 A_K$, respectively. In the illustrated example $h_0$ to $h_4$ have the relative amplitudes of 0.45, $-0.73$, 0.39, 0.2 and $-0.28$, respectively. FIG. 4 illustrates the progression of samples of symbols through a tapped delay line in the situation where a sequence of equally spaced symbols is transmitted at successive intervals $t_0-4$ to $t_0+4$ and where $t_0$ is the current sample and $t_0-4$ to $t_0-1$ are the preceding samples and $t_0+1$ to $t_0+4$ are the following samples. As a result of dispersion in the channel the energy in each symbol is spread so that at any one instant, the receiver is receiving energy which is made up of part of the energy in each of a number of symbols, in this example 5 dispersed symbols. If the symbols are the same then the received energy will be substantially constant. The energy is determined by adding the contributions in a column, that is, the sum of the squares of $0.45A_K$, $-0.75A_K$, $0.39A_K$, $0.2A_K$ and $-0.28A_K$. Assuming that the channel impulse response (CIR) remains constant then it is possible to estimate at any one instant the proportion of each symbol which has contributed to the overall energy.

Figure 5:
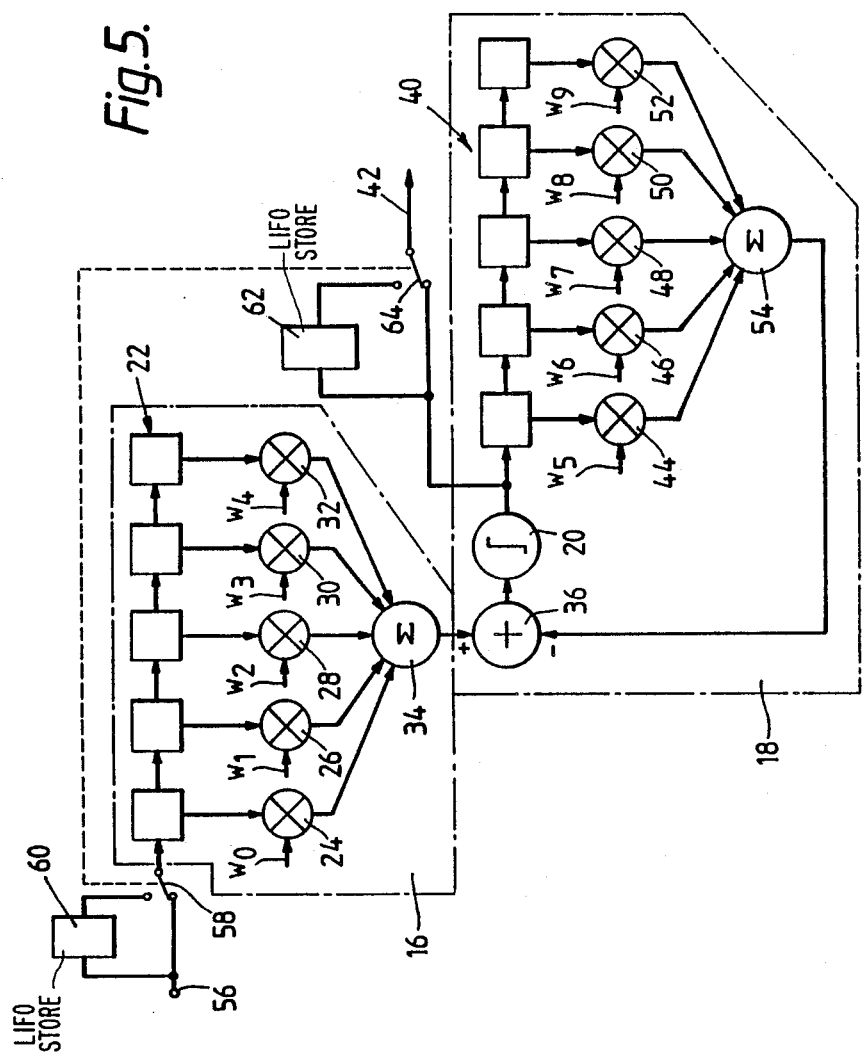
FIG. 5 is a block schematic diagram of a DFE.

FIG. 5 illustrates a decision feedback equalizer which comprises a feedforward filter section 16 and a feedback filter section 18 including a decision stage 20. The feedforward filter section 16 comprises a transversal filter formed by a tapped delay line 22. The taps are connected to respective multipliers 24 to 32 in which the signals derived are multiplied by respective weighting coefficients $w_0$ to $w_4$. The multiplier outputs are summed in an addition stage 34 from where the sum signal is supplied to a subtraction stage 36 in the feedback filter section 18. The feedback filter section 18 is essentially a recursive filter. The decision stage 20 is connected between an output of the subtraction stage 36 and an input to another tapped delay line or shift register 40. Decisions made by the stage 20 are derived on an output 42. Outputs from the respective taps of the delay line or stages of the shift register 40 are coupled to respective multipliers 44 to 52 in which the outputs are multiplied by the weighting coefficients $w_5$ to $w_9$. The outputs from the multipliers 44 to 52 are summed in an addition stage 54 whose output is connected to the subtraction stage 36.

The basic operation of the illustrated DFE is known and can be summarised by saying that the feedforward filter section 16 accepts the received input signal samples and produces a weighted sum of these input signal samples. This sum includes energy from the current input and from the preceding and following symbols. The feedback filter section 18 is driven by the preceding data decisions and in so doing cancels the effects of the preceding symbols on the current decision.

The decision stage 20 makes a decision based on the value of the signal at its input at a certain point in time. This is necessary because the energy in the transmitted pulse 10 is dispersed in time and is represented by the channel impulse response (FIG. 3).

The said point in time is determined by the reference tap position (RTP) which serves as a synchronisation marker between the transmitter and the receiver. As mentioned in the preamble of the present specification in those situations where the channel impulse response is substantially constant such as in a telephone system which has a large signal to noise ratio the RTP is selected as being the peak in the channel impulse response. Sari discusses making the RTP adaptive to obtain the best result in fading conditions. The present invention is concerned with improving the performance of a DFE in a situation of changing channel impulse response and poor signal to noise ratio, the performance in this case being measured by comparing bit error rate (BER) with the signal to noise ratio (SNR) measured in dB. In the described embodiment of the present invention the reference tap position is selected to be the position at which the first acceptable pulse of a train associated with a symbol is located. Preferably the majority if not all the pulses in the train associated with the symbol are contained in the feedforward filter section 16. If the tapped delay line has a length corresponding to the number of pulses in the channel impulse response, then the first pulse and also the RTP will be at the far end of the feedforward filter section 16. By lining-up the RTP with the location of the first pulse of a symbol then a DFE can achieve a performance close to the theoretical optimum for a variable radio channel as predicted by J. Salz in an article "Optimum Mean-Square Decision Feedback Equalization" The Bell System Technical Journal, Oct. 1973 pp 1341 to 1373. The tap weights $w_0$ to $w_4$ applied to the multipliers 24 to 32 in the illustrated example are trained dynamically to optimise the signal output of the DFE. In the event of the anticipated number of pulse samples in the channel impulse response being variable, say 5 or 6 pulses, then the tapped delay line 22 is made bigger and the tap weights are trained accordingly for example in the case of there only being 5 pulses in a channel impulse response then the RTP will be at the far end or the penultimate position from the far end, and the tap weight applied to the multiplier at either the near end or the far end, respectively, of the tapped delay line 22 would be very small or zero.

In the event that equalisation can be performed off-line on stored samples it has been found that operating the equalizing process in reverse time may produce an improved performance. This is particularly applicable when the channel impulse response is very asymmetric. In order to be able to process the stored samples in reverse time as well as forward time the input section of the DFE shown in FIG. 5 comprises an input terminal 56 connected to one pole of a change-over switch 58 and a last-in, first out (LIFO) store 60 connected to a second pole of the switch 58. Thus when the LIFO 60 is connected between the input 56 and the tapped delay line 22, the input signals are applied in a reverse time sequence.

Another LIFO store 62 is connected into the output of the decision stage 20. The output of the decision stage is connected to one pole of a change-over switch 64 to a second pole of which the output of the LIFO 62 is connected. The switches 58 and 64 are ganged so that when it is desired to operate in reverse time sequence both LIFO stores 60, 62 are in circuit with the result that although the equalization is done in a reverse time sequence, the symbols are derived in the proper sequence on the output 42.

Figure 6:
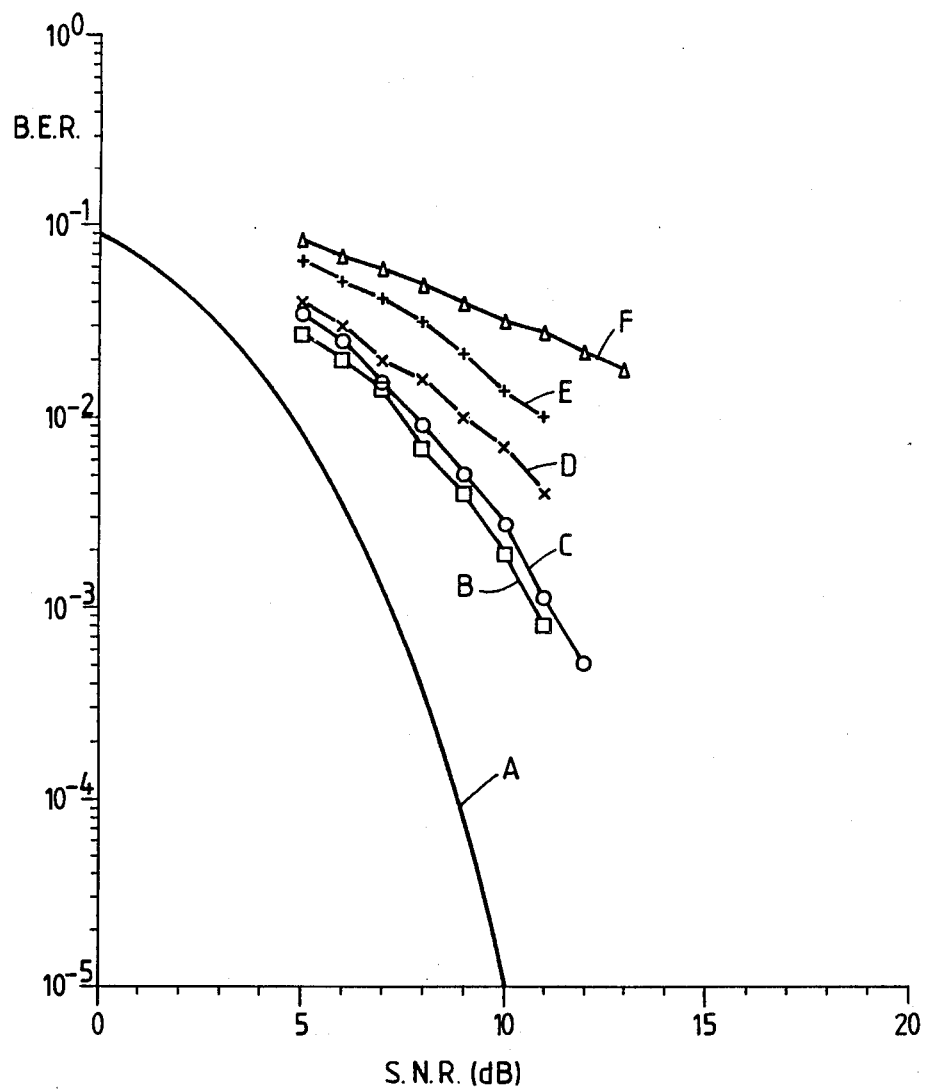
FIG. 6 is a graph of signal to noise ratio (SNR) versus bit error rate (BER) for a DFE having a channel impulse response shown in FIG. 3.

FIG. 6 shows a graph of signal to noise ratio (SNR) in dB versus bit error rate (BER) relating to a channel having the CIR described with reference to FIG. 3. The curve A represents the modulation optimum calculated according to J. Salz in "Optimum Mean Square Error Decision Feedback Equalization", Bell Systems Technical Journal Vol. 52, pages 1341 to 1373, October 1973. Salz's DFE theoretical optimum SNR equation is:

$$\frac{1}{N_0} \exp\left\{ \frac{1}{2\pi} \int_{-\pi}^{\pi} \ln[X(\omega) + N_0] d\omega \right\} - 1 \quad (1)$$

When the coefficients of the equaliser are set to the optimum, there will be a residual error between the equalised signal and the delayed version of the transmitted signal. Salz's equation gives the optimum SNR from which it is possible to calculate the BER of the demodulator which takes the equalised signal.

The curve B is the calculated optimum for the channel. The curve C relates to the RTP being synchronised with the first sample (0.45) of the exemplary CIR and with the DFE operating in forward time. The curve D relates to the DFE operating in reverse time for that same CIR in which case the first sample is now $-0.28$. Curves E and F relate to the RTP being aligned with the peak ($-0.73$) in the CIR with the DFE being operated in forward time and reverse time, respectively. It will be noted that curve C is fairly close to the calculated optimum for the channel and is significantly better than curves E and F.

A possible explanation as to why aligning the RTP with the first sample of the CIR response, assuming that all the samples relating to that symbol are contained in the tapped delay line or shift register of the feedforward filter section 16 (FIG. 5), gives a performance close to the optimum is as follows. Referring to FIG. 4, the arrow RTP(FT) represents the RTP when the DFE is operating in forward time. At $t_o$, the energy present at the location of the first sample (0.45) of the current symbol is due to the current symbol and samples of the preceding 4 symbols only, there is no energy due to the following symbol. Since the feedback filter section 18 of the DFE is driven by the preceding data decisions it cancels the effects of the preceding symbols. The effects of the following symbols is reduced by the feedforward filter section 16. Consequently the output of the DFE is primarily due to the currently transmitted symbol. Choosing a second or a subsequent sample as the RTP will mean that information about the symbol contained in an earlier sample or samples is discarded.

When operating the DFE in time reverse (TR) the reference tap will be located at RTP(TR). The preceding and following samples will now be the following and preceding samples, respectively, of forward time operation. The operation of the DFE itself will be the same.

In the event of the CIR changing then the weighting coefficients $w_0$ to $w_9$ will have to be changed in training operation. Many algorithms have been proposed for achieving the required coefficient adjustments, for example reference is made to the book by J. G. Proakis "Digital Communications" McGraw-Hill Book Company, New York, 1983 (ISBN 0-07-050927-1). Another technique is to recursively train the weighting coefficients by using a training sequence, for example the preamble, transmitted as part of a bigger signal burst.

The optimum filter weighting coefficients for a given tap position are defined as given by the Wiener-Hopf equations $$W_{opt} = R^{-1} p \quad (2)$$

where $W_{opt}$ is the optimum filter weighting coefficients, $R^{-1}$ is the inverse of the channel autocorrelation matrix, p is the cross correlation vector. The residual error is given in terms of the optimum coefficients and the cross correlation vector as residual error $= 1 - W^T_{opt} p$.

The optimum coefficients can be obtained by either solving the matrix equation or recursively the equalizer. When the optimum values are reached the residual error can be used to calculate the signal to noise ratio.

Figure 7:
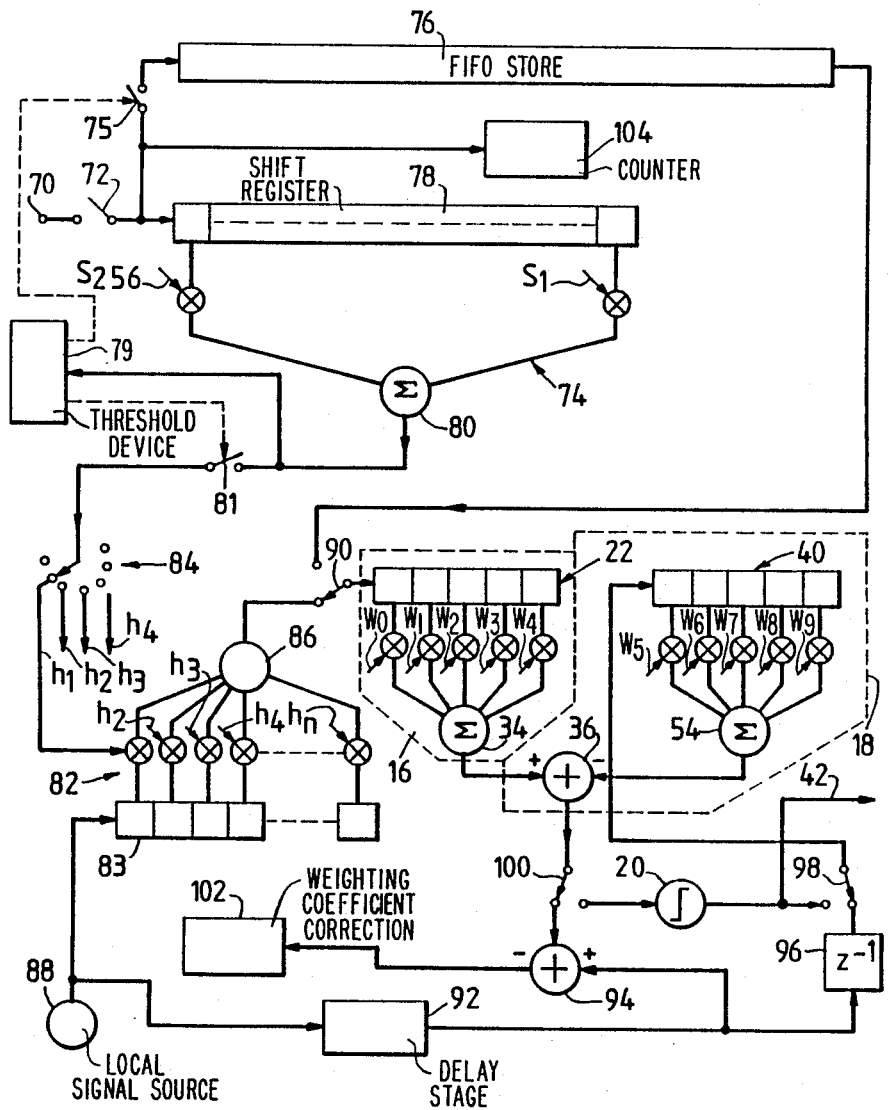
FIG. 7 is a block schematic diagram illustrating how the weighting coefficients of the DFE are determined dynamically.

An example of one means of training the weighting coefficients of a DFE using the preamble is shown in FIG. 7. A signal on an input terminal 70 is sampled by a switch 72. The samples can be applied simultaneously to a correlator 74, to a counter 104 and, by way of a switch 75, to a first in, first out (FIFO) store 76. The correlator 74 comprises a shift register 78 having in this example 256 stages. Each stage is coupled to a respective multiplier in which the signal is multiplied by an associated weighting coefficient $S_1$ to $S_{256}$, the products of the multipliers are added in an addition stage 80 to form successively the coefficients $h_1, h_2 \ldots h_n$.

The FIFO store 76 has a larger number of stages than the shift register 78.

The channel impulse response, CIR, is created by a transversal filter 82 formed by a shift register 83 having n stages. Each stage is connected to a respective multiplier in which a signal is multiplied by a respective weighting coefficient $h_1, h_2, h_3, h_4 \ldots h_n$ which is supplied by a multiplexer 84 coupled via a switch 81 to the addition stage 80 and operating at the sampling rate of the switch 72. The products are summed in an addition stage 86. A local signal source 88, which may comprise a random signal generator, is connected to the shift register 83. The signal from the source 88 is filtered by the CIR response formed by the weighting coefficients $h_l$ to $h_n$ and is applied via a change-over switch to the feedforward filter section 16.

The local signal source 88 is also applied by way of a delay stage 92 to an input of a substraction stage 94 and via another delay element 96, providing a delay corresponding to one clock period, and a change-over switch 98 to the feedback filter section 18 of the DFE. The output of the subtraction stage 36 is connected via change-over switch 100 to the substraction stage 94. During the training period the decision stage 20 is not required because the local signal source 88 provides the correct decisions. The substraction stage 94 is connected to a device 102 for correcting the weighting coefficients $w_0$ to $w_9$ on the basis of a comparison of the difference, or error, between the same signal which has been passed through the locally simulated channel, that is the transversal filter 82, and the DFE. The delay introduced by the delay stage 92 compensates for the signal delay in the transversal filter 82 and the feedforward filter section 16. When the training is complete then the switch 81 is opened and the switches 90, 98 and 100 change-over so that signals from the FIFO store 76 are applied to the feedforward filter section 16 and the decision stage 20 is connected between the output of the substraction stage 36 and the input to the feedback filter section 18.

A threshold device 79 is provided having an input coupled to the signal path between the addition stage 80 and the switch 81. The threshold device 79 controls the operation of the switches 75 and 81.

In operation, the change-over switches 90, 98 and 100 are in the positions shown. Data comprising, for example a preamble followed by a burst of digitised speech is clocked into the correlator 78. At correlation of the preamble, denoted by a peak in the signal at the input to the threshold device 79, the device 79 closes the switches 75 and 81. In response to the closing of the switches 75 and 81, the loading of the burst of the digitised speech samples into the FIFO store 76 via the switch 75 commences and the loading of the impulse response coefficients, via the switch 81 and the multiplexer 84, into the transversal filter 82, commences. At the commencement of loading samples into the FIFO store 76, the counter 104 is started. At a predetermined count corresponding to the burst length as determined by the system design, loading of the FIFO store 76 is stopped by the opening of the switch 75. In the meantime training of the equalizer is initiated. Once the training is completed and the counter 104 has indicated that all digitised speech samples have been stored in the FIFO store 76, the switches 90, 98 and 100 are changed-over and data is downloaded into the DFE for processing. The cycle is repeated for the next signal burst.

The DFE has been described on the basis of the RTP being aligned with the first symbol sample which it is believed will give the best results in terms of bit error rate versus signal to noise ratio. If it should prove to be the case that the RTP has to be aligned with the second symbol sample because the first sample is unacceptable due to it being lost in the noise floor in the receiving apparatus, an acceptable result will be obtained although, because fewer samples of the current symbol will have been considered, the result will not necessarily be the optimum one.

I claim:

1. A decision feedback equalizer, said equalizer being for equalizing sequentially sampled data derived from the transmission of successive symbols via a dispersive signalling channel having an impulse response versus time delay such that an individual symbol produces a first and subsequent symbol samples, with a peak at a time delay corresponding to one of said first and subsequent symbol samples, said equalizer, comprising:
   an input of said equalizer for sampled data received from said channel;
   an output of said equalizer for equalized data samples;
   a feedforward filter section having an input and an output;
   first coupling means for coupling the sampled data from the input of said equalizer to the input of said feedforward filter as applied data;
   a feedback filter section having an input and an output;
   a decision stage having an input and an output;
   second coupling means for coupling the outputs of said feedforward and feedback filter sections to the input of said decision stage; and
   third coupling means for coupling the decision stage to the input of said feedback filter section and to the output of said equalizer;
   wherein said feedforward filter section comprises successive storage locations for a current applied data sample and successively delayed applied data samples preceding the current applied data sample, taps aligned with said successive storage locations, and weighted sum means for applying weighting coefficients to said taps to form the output of the feedforward filter section; and
   means for deriving said weighting coefficients to correspond to a reference tap position of said feedforward filter section which is aligned with a said storage location for an applied data sample delayed with respect to the current applied data sample by the time delay to the peak of the impulse response when the peak occurs at the first symbol sample and which is aligned with a said storage location for an applied data sample delayed with respect to the current applied data sample by less than the time delay to the peak of the impulse response when the peak occurs at a symbol sample after the first symbol sample.

2. A communications receiver including a decision feedback equaliser as claimed in claim 1.

3. An equalizer as claimed in claim 1, wherein said second coupling means comprises a substraction stage having a first input fed by the output of said feedforward filter section, a second input fed by the output of said feedback filter section, and an output for feeding the input of said decision stage.

4. An equalizer as claimed in claim 1, wherein said dispersive signalling channel has a noise threshold and wherein said first symbol sample is the first symbol sample in said impulse response exceeding said noise threshold and wherein said reference tap position is aligned with the storage location for an applied data sample delayed with respect to the current applied data sample by the time delay to said first symbol sample exceeding said noise threshold.

5. An equalizer as claimed in claims 1 or 4, wherein the number of successive storage locations in said feedforward filter section is at least the number of said first and subsequent symbol samples in said impulse response.

6. An equalizer as claimed in claims 1 or 4, wherein said first coupling means comprises means for storing a block of sequential data samples received from said channel and outputting said block in time reversed order as said applied data.

7. An equalizer as claimed in claims 1 or 4, wherein said third coupling means comprises means for storing a block of sequential data samples received from the output of the decision stage and outputting said block in time reversed order as said equalised data samples.

8. An equalizer as claimed in claim 1 or 4, wherein said first and second coupling means further comprise training means selectively coupled to the inputs and outputs of said feedforward filter and feedback filter sections for selectively measuring the impulse response of said dispersive signalling channel and for recursively adjusting said weighting coefficients in response to said measured impulse response.

9. A method of operating a decision feedback equalizer for equalizing sequentially sampled data derived from the transmission of successive symbols via a dispersive communications channel having an impulse response versus time delay such that an individual symbol produces a first and subsequent symbol samples, with a peak at a time delay corresponding to one of said first and subsequent symbol samples, comprising a transversal feedforward filter section, having successive tapped storage locations for a current applied data sample and successively delayed applied data samples preceding the current applied data sample, coupled to a decision stage included in a feedback filter section, said method comprising:

sequentially applying samples of data derived from the dispersive communications channel to an input of said of the feedforward filter section;

progressing the applied data samples stagewise from a first of said storage locations to a last of said storage locations; and applying weighting coefficients to taps from said storage locations to form an output of the feedforward filter section as a weighted sum of the contents of said storage locations, said weighting coefficients being chosen to correspond to a reference tap position of said feedforward filter section which is aligned with a said storage location for an applied data sample delayed with respect to the current applied data sample by the time delay to the peak of the impulse response when the peak occurs at the first symbol sample and which is aligned with a said storage location for an applied data sample delayed with respect to the current applied data sample by less than the time delay to the peak of the impulse response when the peak occurs at a symbol sample after the first symbol sample.

10. A method as claimed in claim 9, wherein said dispersive signalling channel has a noise threshold and wherein said first symbol sample is the first symbol sample in said impulse response exceeding said noise threshold and wherein said reference tap position is aligned with the storage location for an applied data sample delayed with respect to the current applied data sample by the time delay to said first symbol sample exceeding said noise threshold.

11. A method as claimed in claims 9 or 10, further comprising deriving the sequential data samples applied to the input of the feedforward filter section by storing a block of sequential data samples received via the dispersive communications channel and outputting said block in time reversed order as applied data samples.

12. A method as claimed in claim 11, further comprising:

substracting outputs of said feedforward and feedback filter sections to form an input to said decision stage; and forming an output of said equaliser by storing a block of sequential data samples at an output of said decision stage and outputting said block in time reversed order as equalized data samples.

13. A method as claimed in claims 9 or 10 further comprising:

measuring the impulse response of said dispersive communications channel; and recursively adjusting said weighting coefficients in response to said measured impulse response.

* * * * *